United States Patent
Jansone-Popova

(10) Patent No.: US 11,369,944 B2
(45) Date of Patent: Jun. 28, 2022

(54) ORGANIC POLYMER COMPOSITIONS FOR REMOVAL OF OXOANIONS FROM AQUEOUS SOLUTIONS

(71) Applicant: UT-Battelle, LLC, Oak Ridge, TN (US)

(72) Inventor: Santa Jansone-Popova, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 174 days.

(21) Appl. No.: 16/660,142

(22) Filed: Oct. 22, 2019

(65) Prior Publication Data

US 2020/0122118 A1    Apr. 23, 2020

Related U.S. Application Data

(60) Provisional application No. 62/749,278, filed on Oct. 23, 2018.

(51) Int. Cl.
    *B01J 20/26* (2006.01)
    *B01J 20/24* (2006.01)
    (Continued)

(52) U.S. Cl.
    CPC ............ *B01J 20/262* (2013.01); *B01J 20/24* (2013.01); *B01J 20/2808* (2013.01); *B01J 20/3425* (2013.01); *C08L 79/02* (2013.01)

(58) Field of Classification Search
    CPC ........... B01D 2253/202; B01D 2325/18; B01J 20/262
    See application file for complete search history.

(56) References Cited

U.S. PATENT DOCUMENTS

| 2017/0109521 A1 | 4/2017 | Ujiie et al. |
| 2018/0134590 A1 | 5/2018 | Arnold |

(Continued)

FOREIGN PATENT DOCUMENTS

| CN | 107413314 A | 12/2017 |
| WO | 2017109521 A1 | 6/2017 |

OTHER PUBLICATIONS

Jansone-Popova et al. "Guanidinium-Based Ionic Covalent Organic Framework for Rapid and Selective Removal of Toxic Cr(VI) Oxoanions from Water" (Environ. Sci. Technol. 2019, 53, 878-883; published Oct. 16, 2018) (Year: 2018).*

(Continued)

*Primary Examiner* — Ryan B Huang
(74) *Attorney, Agent, or Firm* — Scully, Scott, Murphy & Presser, P.C.

(57) ABSTRACT

An organic polymer composition (OPC) comprising guanidinium-containing A units interconnected with B units of the formula *—R—(*)$_r$, wherein each asterisk (*) in A units denotes a connection point with an asterisk in B units; R is a hydrocarbon linking group containing at least one carbon atom; r is an integer of 1, 2, or 3; and the composition necessarily includes an anionic species $X^{m-}$ with a magnitude of charge m of at least 1, wherein the sum of negative charge provided by anionic species $X^{m-}$ counterbalances the total positive charge provided by the A units. Also described herein is a method for removing one or more oxoanions from an aqueous source by (i) contacting the aqueous source with the above described OPC to result in absorption of the oxoanion into the OPC to produce an oxoanion-containing OPC; and (ii) removing the oxoanion-containing OPC from the aqueous source.

33 Claims, 10 Drawing Sheets

(51) Int. Cl.
C08L 79/02 (2006.01)
B01J 20/28 (2006.01)
B01J 20/34 (2006.01)

(56) References Cited

U.S. PATENT DOCUMENTS

2018/0134655 A1   5/2018   Custelcean et al.
2019/0010118 A1   1/2019   Custelcean et al.
2019/0299124 A1   10/2019  Williams et al.

OTHER PUBLICATIONS

Mitra et al. "Self-Exfoliated Guanidinium-Based Ionic Covalent Organic Nanosheets (iCONs)" (J. Am. Chem. Soc. 2016, 138, 2823-2828) (Year: 2016).*

Custelcean et al. "Aqueous Sulfate Separation by Sequestration of [(SO4)2(H2O)4]4-Clusters within Highly Insoluble Imine-Linked Bis-Guanidinium Crystals" (Chem. Eur. J. 2016, 22, 1997-2003) (Year: 2016).*

Blondeau et al., "Molecular recognition of oxoanions based on guanidinium receptors", Chem. Soc Rev , 13:198-210, Nov. 9, 2016.

Custelcean et al., "Aqueous Sulfate Separation by Sequestration of [(SO4)2(H2O)4]4-Clusters within Highly Insoluble Imine-Linked Bis-Guanidinium Crystals", Chemistry A European Journal, 22:1997-2003, (2016).

Das et al., "Folic Acid-Polyaniline Hybrid Hydrogel for Adsorption/Reduction of Chromium(VI) and Selective Adsorption of Anionic Dye from Water", ACS Sustainable Chemistry & Engineering, 5:9325-9337, Aug. 15, 2017.

Du et al., "Ionic Covalent Organic Frameworks with Spiroborate Linkage", Angewandte Chemie International Edition, 55:1737-1741, (2016).

Li et al., "Three-Dimensional Ionic Covalent Organic Frameworks for Rapid, Reversible, and Selective Ion Exchange", Journal of the American Chemical Society, 139:17771-17774, Nov. 28, 2017.

Mitra et al., "Self-Exfoliated Guanidinium-Based Ionic Covalent Organic Nanosheets (iCONs)", Journal of the American Chemical Society, 138:2823-2828, Feb. 11, 2016.

Segura et al., "Covalent organic frameworks based on Schiff-base chemistry: synthesis, properties and potential applications", Chem. Soc. Rev., 45:5635-5671, Nov. 27, 2015.

Su et al., "Imidazolium-Based Porous Organic Polymers: Anion Exchange-Driven Capture and Luminescent Probe of Cr2072-", ACS Applied Materials and Interfaces, 8:18904-18911, Jul. 1, 2016.

Zhao et al., "Selective Removal of Cr(VI) Oxyanions with a New Anion Exchanger", Ind. Eng. Chem. Res., 37:4383-4387, Oct. 2, 1998.

* cited by examiner

A: cppi, phenyl carbons ($CH_0$)
B: cp, phenyl carbons ($CH_1$)
C: cp, imine carbons (-C(H)=N-)
D: cppi, guanidinium carbons

ORGANIC POLYMER COMPOSITIONS FOR REMOVAL OF OXOANIONS FROM AQUEOUS SOLUTIONS

CROSS REFERENCE TO RELATED APPLICATION

The present application claims benefit of U.S. Provisional Application No. 62/749,278, filed on Oct. 23, 2018, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention generally relates to organic polymer compositions useful for removing oxoanion (oxyanion) species from aqueous solutions and to methods for using such compositions in removing oxoanion species, such as removal of chromate, arsenate, selenate, or sulfate from water and aqueous solutions. The present invention more particularly relates to guanidinium-containing organic polymer compositions and methods of using such compositions in removing oxoanion species.

BACKGROUND OF THE INVENTION

Effective removal of toxic or otherwise undesirable oxoanions from aqueous solutions remains a major challenge, despite recent progress in anion receptor chemistry. Demand is increasing for functional materials that can achieve fast and efficient removal of toxic species from the groundwater. Chromium(VI), in particular, is one of the major water pollutants and at concentrations greater than 50 ppb in drinking water can cause severe damage to living organisms due to its carcinogenic and mutagenic properties and strong oxidizing power.

A variety of processes, such as chemical precipitation via reduction, ion exchange, sorption, and filtration have been explored towards removal of Cr(VI) from drinking water. However, the drawbacks associated with these processes include high cost, slow kinetics, incomplete removal of toxic metal, and the lack of selectivity in real systems. There would be a significant benefit in a straight-forward and cost-efficient process that could remove a substantial portion or substantially all chromate or other undesirable oxoanion species (e.g., arsenate, perrhenate, pertechnetate, selenate, sulfate, molybdate, perchlorate, perbromate, and/or periodate) from aqueous solutions. There would also be a further benefit in such a method that could remove such oxoanions selectively, such as by preferentially removing chromate or arsenate when in the presence of other common oxoanions, such as sulfate, nitrate, and carbonate.

SUMMARY OF THE INVENTION

The present disclosure is directed to novel organic polymer compositions (OPCs) and their use for rapidly removing one or more oxoanions, such as chromate and arsenate oxoanions, from aqueous solutions, such as streams and other bodies of water. The compositions described herein can remove one or more oxoanions from aqueous solutions with exceptional selectivity and uptake capacity, e.g., ranging from 90 to 200 mg/g depending on the pH of the medium.

The current US Environmental Protection Agency maximum contaminant level for Cr(VI) in drinking water is 100 ppb. Selective, efficient and fast removal of Cr(VI) from water is a challenge that current state-of-the-art ion exchange resins or natural sorbents cannot address effectively. The new sorbent OPCs described herein can remove toxic Cr(VI) from water within minutes; the uptake capacity is high (e.g., ranges from 90 to 200 mg/g); operates over a wide range of pH values (e.g., 2-10); can lower Cr(VI) concentration in water from 1000 ppb level to 10 ppb level in just one minute; and is selective for Cr(VI) oxoanions even in the presence of other anions, such as chloride, sulfate, nitrate; is easy to synthesize (e.g., in just one step from commercially available starting materials); and can be reused after the removal of Cr(VI) from water, e.g., chromium can be stripped from the sorbent with base and the sorbent can be regenerated with acid.

The organic polymer compositions are constructed of A and B units, wherein the A and B units are defined as follows:

A units:

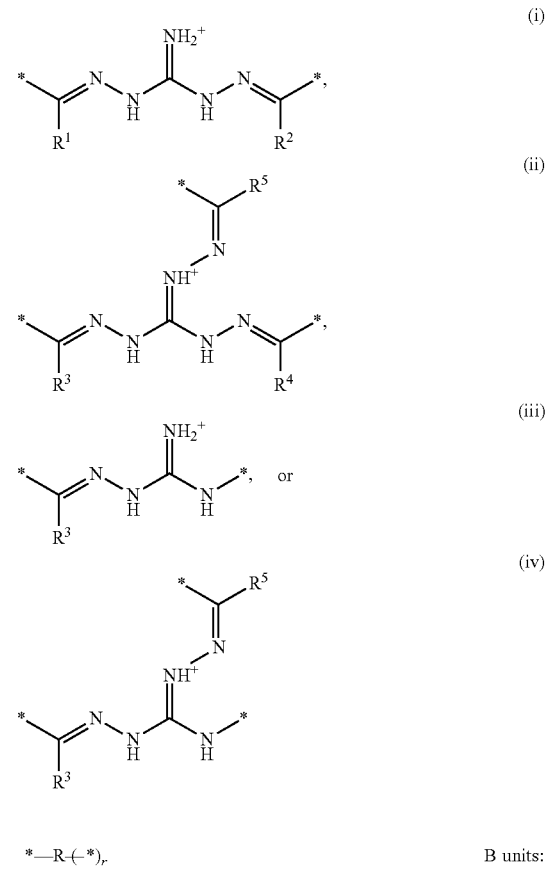

B units:

wherein: the composition includes at least two A units and at least one B unit; each asterisk (*) in A units denotes a connection point with an asterisk in B units, provided that, in the event of surplus asterisks being present, the surplus asterisks are terminated by endcapping groups; R is a hydrocarbon linking group containing at least one carbon atom (e.g., 1-30 carbon atoms); $R^1$, $R^2$, $R^3$, $R^4$, and $R^5$ groups are independently selected from hydrogen atoms and hydrocarbon groups containing 1-6 carbon atoms; r is an integer of 1, 2, or 3; and the composition necessarily includes an anionic species $X^{m-}$ with a magnitude of charge m of at least 1, wherein the sum of negative charge provided by anionic species X' counterbalances the total positive charge provided by the A units.

The method for removing oxoanions includes the following steps: (i) contacting the aqueous source with the organic polymer composition described above to result in absorption of the oxoanion into the organic polymer composition to produce an oxoanion-containing organic polymer; and (ii) removing the oxoanion-containing organic polymer from the aqueous source. In particular embodiments, the oxoanion is a tetrahedral oxoanion, such as one or more selected from chromate, arsenate, perrhenate, pertechnetate, selenate, sulfate, molybdate, perchlorate, perbromate, and periodate (or more particularly, chromate and/or arsenate). In some embodiments, in step (i), chromate or arsenate is selectively absorbed in the organic polymer composition when the chromate or arsenate is in the presence of one or more other types of oxoanions. In some embodiments, step (i) is achieved by passing the aqueous source solution through a column containing the organic polymer composition. In other embodiments, step (i) is achieved by adding the organic polymer composition to the aqueous source solution, agitating the aqueous source solution, and filtering the organic polymer composition from the aqueous source solution. In further embodiments, the method includes: (iii) regenerating the organic polymer composition with concomitant release of the oxoanion by treating the oxoanion-containing organic polymer composition with a base to result in a deprotonated organic polymer composition, followed by re-protonation of the deprotonated organic polymer composition by treatment with an acid.

BRIEF DESCRIPTION OF THE DRAWINGS

FIG. 1A shows a synthetic scheme of BT-DG$_{Cl}$. FIG. 1B shows the $^{13}$C cp and cppi MAS solid-state NMR spectra of BT-DG$_{Cl}$ spun at 5 kHz. FIG. 1C shows a TGA curve of BTDG$_{Cl}$ from 50° C. to 750° C. at 10° C./minute in nitrogen atmosphere at a purge rate of 20 mL/minute.

FIG. 2A is a plot showing the effect of the contact time on the Cr(VI) remoal by BT-DG$_{Cl}$; initial pH=7; dose 5 g/L; T=25° C.; $C_{Cr(VI)}$=20 mM. FIG. 2B shows the uptake isotherm of BT-DG$_{Cl}$. FIG. 2C is a linear regression plot using the Langmuir adsorption model. FIG. 2D is a plot showing the effect of the initial pH on the Cr(VI) removal by BT-DG$_{Cl}$; dose of 5 g/L; T=25C; $C_{Cr(VI)}$=20 mM; time=10 minutes. FIG. 2E shows the effect of the contact time on the Cr(VI) removal by BT-DG$_{Cr}$: initial pH=7; dose 5 g/L; T=25° C.; Cr(VI)=1 ppm. FIG. 2F shows the effect of the concentration of different oxoanions on the removal of Cr(VI) by BT-DG$_{Cl}$: initial pH=7; dose 5 g/L; T=25° C.; $C_M$=20, 10, 1 mM each; time=10 min.

DETAILED DESCRIPTION OF THE INVENTION

Figure 1A:
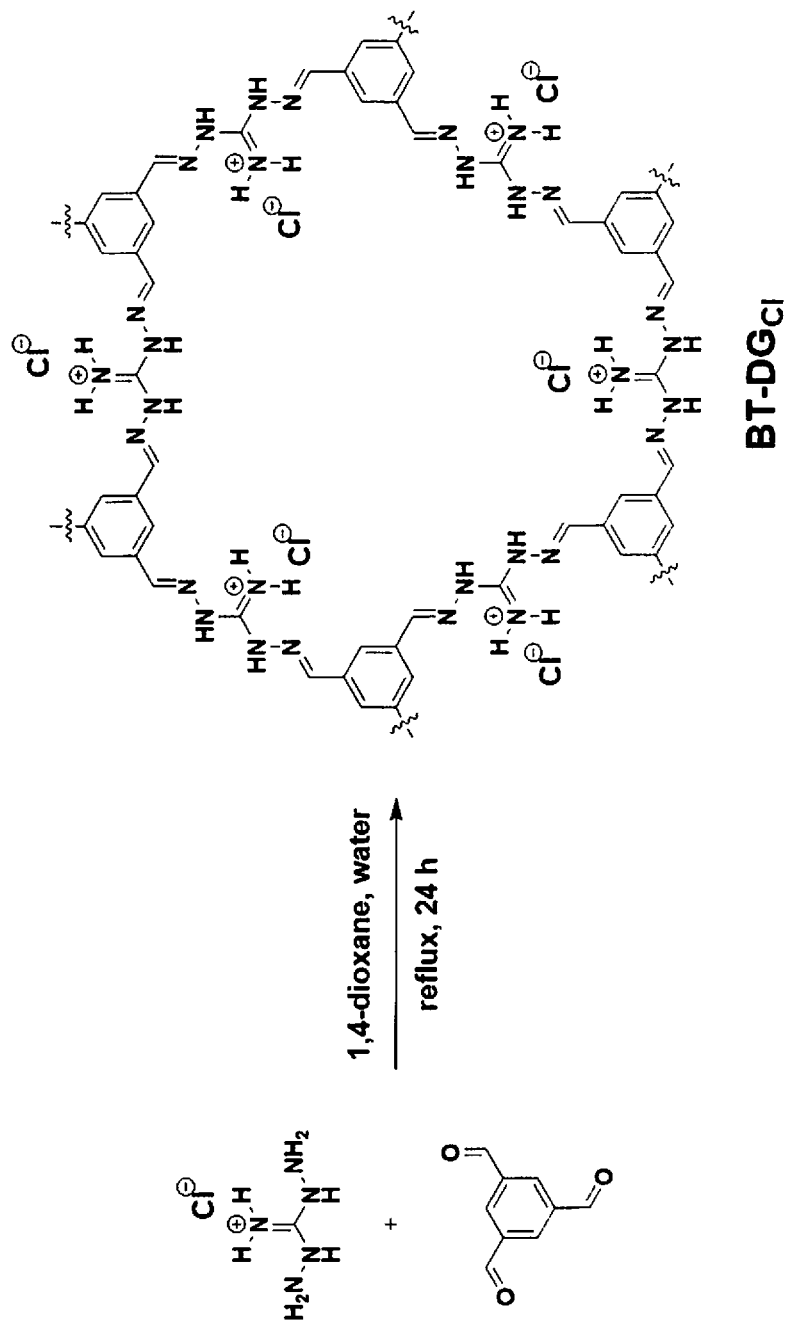
FIGS. 1A-1C show a selected synthetic strategy and resulting elucidation of a novel OPC herein referred to as BT-DG$_{Cl}$.

The term "hydrocarbon group" (also denoted by the group R) is, in a first embodiment, defined as a chemical group composed solely of carbon and hydrogen and containing at least one carbon-hydrogen (C—H) bond, except that the hydrocarbon group may (i.e., optionally) be substituted with one or more fluorine atoms to result in partial or complete fluorination of the hydrocarbon group. The term "hydrocarbon linker" refers to a linking hydrocarbon group, which can be derived from any hydrocarbon group described herein by removal of one, two, or three hydrogen atoms to result in a divalent, trivalent, or tetravalent hydrocarbon linker, respectively (e.g., the divalent hydrocarbon linker —R— can be derived from hydrocarbon group —R, wherein "-" or "—" represents a bond). In different embodiments, one or more of the hydrocarbon groups or linkers can contain precisely, or a minimum of, or a maximum of, for example, 1, 2, 3, 4, 5, 6, 7, 8, 9, 10, 12, 15, 18, 20, 22, 24, 26, 28, or 30 carbon atoms, or a number of carbon atoms within a particular range bounded by any two of the foregoing carbon numbers. Hydrocarbon groups in different compositions described herein or within different units of the same composition may possess the same or different number (or preferred range thereof) of carbon atoms in order to independently adjust or optimize such properties as the complexing ability, extracting (extraction affinity) ability, or selectivity of the compound.

In a first set of embodiments, the hydrocarbon group or linker (R) is a saturated and straight-chained group or linker, i.e., a straight-chained (linear) alkyl group or linker. Some examples of straight-chained alkyl groups include methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-eicosyl, n-docosyl, n-tetracosyl, n-hexacosyl, n-octacosyl, and n-triacontyl groups.

In a second set of embodiments, the hydrocarbon group or linker (R) is saturated and branched, i.e., a branched alkyl group or linker. Some examples of branched alkyl groups include isopropyl (2-propyl), isobutyl (2-methylprop-1-yl), sec-butyl (2-butyl), t-butyl (1,1-dimethylethyl-1-yl), 2-pentyl, 3-pentyl, 2-methylbut-1-yl, isopentyl (3-methylbut-1-yl), 1,2-dimethylprop-1-yl, 1,1-dimethylprop-1-yl, neopentyl (2,2-dimethylprop-1-yl), 2-hexyl, 3-hexyl, 2-methylpent-1-yl, 3-methylpent-1-yl, isohexyl (4-methylpent-1-yl), 1,1-dimethylbut-1-yl, 1,2-dimethylbut-1-yl, 2,2-dimethylbut-1-yl, 2,3-dimethylbut-1-yl, 3,3-dimethylbut-1-yl, 1,1,2-trimethylprop-1-yl, and 1,2,2-trimethylprop-1-yl groups, isoheptyl, isooctyl, and the numerous other branched alkyl groups having up to 20 or 30 carbon atoms, wherein the "1-yl" suffix represents the point of attachment of the group.

In a third set of embodiments, the hydrocarbon group or linker (R) is saturated and cyclic, i.e., a cycloalkyl group or linker. Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicyclic) group by either possessing a bond between two ring groups (e.g., dicyclohexyl) or a shared (i.e., fused) side (e.g., decalin and norbornane).

In a fourth set of embodiments, the hydrocarbon group or linker (R) is unsaturated and straight-chained, i.e., a straight-chained (linear) olefinic or alkenyl group or linker. The unsaturation occurs by the presence of one or more carbon-carbon double bonds and/or one or more carbon-carbon triple bonds. Some examples of straight-chained olefinic groups include vinyl, propen-1-yl (allyl), 3-buten-1-yl (CH$_2$=CH—CH$_2$—CH$_2$—), 2-buten-1-yl (CH$_2$=CH—CH—CH$_2$—), butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, propargyl (2-propynyl), 3-butynyl, and the numerous other straight-chained alkenyl or alkynyl groups having up to 20 or 30 carbon atoms.

In a fifth set of embodiments, the hydrocarbon group or linker (R) is unsaturated and branched, i.e., a branched olefinic or alkenyl group or linker. Some examples of branched olefinic groups include propen-2-yl ($CH_2$=C.—$CH_3$), 1-buten-2-yl ($CH_2$=C.—$CH_2$—$CH_3$), 1-buten-3-yl ($CH_2$=CH—CH.—$CH_3$), 1-propen-2-methyl-3-yl ($CH_2$=C($CH_3$)—$CH_2$—), 1-penten-4-yl, 1-penten-3-yl, 1-penten-2-yl, 2-penten-2-yl, 2-penten-3-yl, 2-penten-4-yl, and 1,4-pentadien-3-yl, and the numerous other branched alkenyl groups having up to 20 or 30 carbon atoms, wherein the dot in any of the foregoing groups indicates a point of attachment.

In a sixth set of embodiments, the hydrocarbon group or linker (R) is unsaturated and cyclic, i.e., a cycloalkenyl group or linker. The unsaturated cyclic group or linker can be aromatic or aliphatic. Some examples of unsaturated cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, and cyclooctatetraenyl groups. The unsaturated cyclic hydrocarbon group or linker may or may not also be a polycyclic group (such as a bicyclic or tricyclic polyaromatic group) by either possessing a bond between two of the ring groups (e.g., biphenyl) or a shared (i.e., fused) side, as in naphthalene, anthracene, phenanthrene, phenalene, or indene fused ring systems.

One or more of the hydrocarbon groups (or linkers) described above may also include one or more heteroatoms (i.e., non-carbon and non-hydrogen atoms), such as one or more elements selected from oxygen, nitrogen, sulfur, silicon, phosphorus, boron, and halide atoms, as well as groups containing one or more of these heteroatoms (i.e., heteroatom-containing groups). Some examples of oxygen-containing groups include hydroxy (OH), alkoxy (OR), carbonyl-containing (e.g., carboxylic acid, ketone, aldehyde, carboxylic ester, amide, and urea functionalities), nitro ($NO_2$), carbon-oxygen-carbon (ether), sulfonyl, and sulfinyl (i.e., sulfoxide) groups. Some particular examples of alkoxy groups —OR include methoxy, ethoxy, n-propoxy, isopropoxy, n-butoxy, isobutoxy, t-butoxy, phenoxy, benzyloxy, 2-hydroxyethoxy, 2-methoxyethoxy, 2-ethoxyethoxy, vinyloxy, and allyloxy groups. In the case of an ether group, the ether group can also be a polyalkyleneoxide (polyalkyleneglycol) group, such as a polyethyleneoxide group. Some examples of nitrogen-containing groups include primary amine, secondary amine, tertiary amine (i.e., —$NR_2$ or $NR_3^+$, wherein R is independently selected from H and hydrocarbon groups set forth above), nitrile, amide (i.e., —C(O)$NR_2$ or —NRC(O)R, wherein R is independently selected from hydrogen atom and hydrocarbon groups set forth above), imine (e.g., —CR=NR, wherein R is independently H or a hydrocarbon group), oxime (—CR=N—OH), amidoxime (—C($NH_2$)=N—OH), nitro, urea (—NR—C(O)—$NR_2$, wherein R is independently H or a hydrocarbon group), and carbamate groups (—NR—C(O)—OR, wherein R is independently H or a hydrocarbon group). Some examples of phosphorus-containing groups include —$PR_2$, —$PR_3^+$, —P(=O)$R_2$, —P(OR)$_2$, —O—P(OR)$_2$, —R—P(OR)$_2$, —P(=O)(OR)$_2$, —O—P(=O)(OR)$_2$, —O—P(=O)(OR)(R), —O—P(=O)$R_2$, —R—P(=O)(OR)$_2$, —R—P(=O)(OR)(R), and —R—P(=O)$R_2$ groups, wherein R is independently selected from hydrogen atom and hydrocarbon groups set forth above. Some examples of sulfur-containing groups include mercapto (i.e., —SH), thioether (i.e., sulfide, e.g., —SR), disulfide (—R—S—S—R), sulfoxide (—S(O)R), sulfone (—$SO_2$R), sulfonate (—S(=O)$_2$OR, wherein R is H, a hydrocarbon group, or a cationic group), and sulfate groups (—OS(=O)$_2$OR, wherein R is H, a hydrocarbon group, or a cationic group). Some examples of halide atoms include fluorine, chlorine, bromine, and iodine. One or more of the heteroatoms described above (e.g., oxygen, nitrogen, and/or sulfur atoms) can be inserted between carbon atoms (e.g., as —O—, —NR—, or —S—) in any of the hydrocarbon groups described above to form a heteroatom-substituted hydrocarbon group or linker. Alternatively, or in addition, one or more of the heteroatom-containing groups can replace one or more hydrogen atoms on the hydrocarbon group or linker.

In embodiments where the hydrocarbon group or linker (R) is or includes a cyclic group, the cyclic group or linker may be monocyclic by containing a single ring without connection or fusion to another ring. The cyclic hydrocarbon group or linker may alternatively be, for example, bicyclic, tricyclic, tetracyclic, or a higher polycyclic ring system by having at least two rings interconnected (i.e., by a bond) and/or fused.

In some embodiments, the cyclic hydrocarbon group or linker is carbocyclic, i.e., does not contain ring heteroatoms (i.e., only ring carbon atoms). In different embodiments, ring carbon atoms in the carbocyclic group are all saturated, or a portion of the ring carbon atoms are unsaturated, or the ring carbon atoms are all unsaturated, as found in aromatic carbocyclic groups, which may be monocyclic, bicyclic, tricyclic, or higher polycyclic aromatic groups.

In some embodiments, the hydrocarbon group or linker (R) is or includes a cyclic or polycyclic group or linker that includes at least one ring heteroatom (for example, one, two, three, four, or higher number of heteroatoms). Such ring heteroatom-substituted cyclic groups or linkers are referred to herein as "heterocyclic groups" or "heterocyclic linkers". As used herein, a "ring heteroatom" is an atom other than carbon and hydrogen (typically, selected from nitrogen, oxygen, and sulfur) that is inserted into, or replaces a ring carbon atom in a hydrocarbon ring structure. In some embodiments, the heterocyclic group or linker is saturated, while in other embodiments, the heterocyclic group or linker is unsaturated (i.e., aliphatic or aromatic heterocyclic groups, wherein the aromatic heterocyclic group is also referred to herein as a "heteroaromatic ring" or a "heteroaromatic fused-ring system" in the case of at least two fused rings, at least one of which contains at least one ring heteroatom).

Some examples of saturated heterocyclic groups (R) containing at least one oxygen atom include oxetane, tetrahydrofuran, tetrahydropyran, 1,4-dioxane, 1,3-dioxane, and 1,3-dioxepane rings. Some examples of saturated heterocyclic groups (R) containing at least one nitrogen atom include pyrrolidine, piperidine, piperazine, imidazolidine, azepane, and decahydroquinoline rings. Some examples of saturated heterocyclic groups (R) containing at least one sulfur atom include tetrahydrothiophene, tetrahydrothiopyran, 1,4-dithiane, 1,3-dithiane, and 1,3-dithiolane rings. Some examples of saturated heterocyclic groups (R) containing at least one oxygen atom and at least one nitrogen atom include morpholine and oxazolidine rings. An example of a saturated heterocyclic group containing at least one oxygen atom and at least one sulfur atom includes 1,4-thioxane. An example of a saturated heterocyclic group containing at least one nitrogen atom and at least one sulfur atom includes thiazolidine and thiamorpholine rings. Saturated heterocyclic linkers (R) can be derived from any of the foregoing saturated heterocyclic groups by removal of one, two, or three hydrogen atoms from the saturated heterocyclic group to result in a divalent, trivalent, or tetravalent saturated heterocyclic linker, respectively.

Some examples of unsaturated heterocyclic groups (R) containing at least one oxygen atom include furan, pyran, 1,4-dioxin, benzofuran, dibenzofuran, and dibenzodioxin rings. Some examples of unsaturated heterocyclic groups (R) containing at least one nitrogen atom include pyrrole, imidazole, pyrazole, pyridine, pyrazine, pyrimidine, 1,3,5-triazine, azepine, diazepine, indole, purine, benzimidazole, indazole, 2,2'-bipyridine, quinoline, isoquinoline, phenanthroline, 1,4,5,6-tetrahydropyrimidine, 1,2,3,6-tetrahydropyridine, 1,2,3,4-tetrahydroquinoline, quinoxaline, quinazoline, pyridazine, cinnoline, 5,6,7,8-tetrahydroquinoxaline, 1,8-naphthyridine, and 4-azabenzimidazole rings. Some examples of unsaturated heterocyclic groups containing at least one sulfur atom include thiophene, thianaphthene, and benzothiophene rings. Some examples of unsaturated heterocyclic groups (R) containing at least one oxygen atom and at least one nitrogen atom include oxazole, isoxazole, benzoxazole, benzisoxazole, oxazoline, 1,2,5-oxadiazole (furazan), and 1,3,4-oxadiazole rings. Some examples of unsaturated heterocyclic groups (R) containing at least one nitrogen atom and at least one sulfur atom include thiazole, isothiazole, benzothiazole, benzoisothiazole, thiazoline, and 1,3,4-thiadiazole rings. Unsaturated heterocyclic linkers (R) can be derived from any of the foregoing unsaturated heterocyclic groups by removal of one, two, or three hydrogen atoms from the unsaturated heterocyclic group to result in a divalent, trivalent, or tetravalent unsaturated heterocyclic linker, respectively.

In one aspect, the invention is directed to organic polymer compositions (i.e., "OPCs") constructed of two or more A units and one or more B units, wherein the A units contain a guanidinium structure and the B units contain hydrocarbon linking portions that connect between A units. The B units interconnect between A units via imine (i.e., —C=N—) linking groups. At least some (or all) of the imine linkages in the OPC are also amino-imine linkages, i.e., —C=N—N(R')— linkages, wherein R' is H or a hydrocarbon. The OPCs also include iminium ions (i.e., —C=NH$_2^+$ groups or —C=NR'$^+$— linkers) as part of the A units. Thus, the OPCs necessarily include an anionic species X$^{m-}$ with a magnitude of charge m of at least 1, wherein the sum of negative charge provided by anionic species X' counterbalances the total positive charge provided by the A units.

The A units are selected from one or more of the following species:

A units:

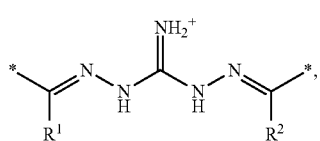

(i)

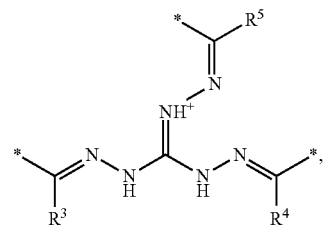

(ii)

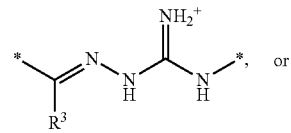

(iii)

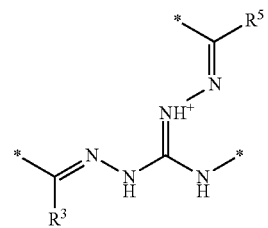

(iv)

Some A units may also be dimers of any of the above species (i)-(iv), particularly dimers of species (iii) and (iv), as shown below:

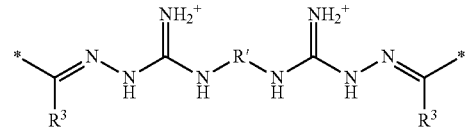

(v)

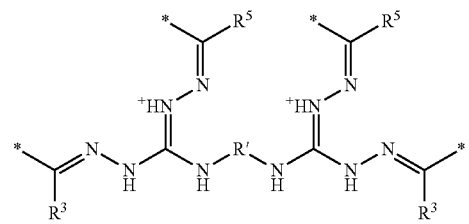

(vi)

wherein R' above represents a hydrocarbon linker (R), or more particularly, a hydrocarbon linker containing 1-6 carbon atoms.

The B units have the following structure:

In the A units, R$^1$, R$^2$, R$^3$, R$^4$, and R$^5$ groups are independently selected from hydrogen atoms and hydrocarbon groups containing 1-6 carbon atoms. The hydrocarbon groups containing 1-6 carbon atoms can be selected from any of the hydrocarbon groups (R), described above, having 1-6 carbon atoms (e.g., methyl, ethyl, n-propyl, and isopropyl). In some embodiments, R$^1$, R$^2$, R$^3$, R$^4$, and R$^5$ groups are all hydrogen atoms. In other embodiments, at least one, two, or three of R$^1$, R$^2$, R$^3$, R$^4$, and R$^5$ groups are hydrocarbon groups containing 1-6 carbon atoms. Notably, the two or more A units in the OPC may all be structurally the same or different.

In the B units, R is a hydrocarbon linker, as described above, containing at least one carbon atom and optionally containing one or more heteroatoms or heteroatom-containing groups. In some embodiments, R corresponds to any of the hydrocarbon linkers (R) described above containing 1-30 carbon atoms and optionally containing one or more heteroatoms or heteroatom-containing groups. In some embodiments, R has the structure —$(CH_2)_t$—, wherein t is at least 1 and up to 30, and each hydrogen atom is optionally and independently substituted with a methyl or ethyl group, or one or two hydrogen atoms may be removed to make R trivalent or tetravalent, or two adjacent hydrogen atoms may be removed to include a carbon-carbon double bond between adjacent carbon atoms. In particular embodiments, R is a ring-containing linker (e.g., any of the saturated or unsaturated carbocyclic or heterocyclic rings or ring systems described above). In further particular embodiments, R is a five- or six-membered ring, such as a cyclohexane, cyclohexene, cyclohexadiene, benzene, cyclopentane, cyclopentene, or cyclopentadiene ring. Notably, in instances where multiple R units (i.e., B units) are present in the OPC, the R units may all be structurally the same or different. For example, an OPC may have a portion of R units being methylene or ethylene and another portion of R units being phenylene. The subscript r is an integer of 1, 2, or 3, which results in the R linker being divalent, trivalent, or tetravalent, respectively. The linker (R) can be derived from any of the hydrocarbon groups (R) provided above by removal of one, two, or three (or more) hydrogen atoms.

Each asterisk (*) in A units denotes a connection point with an asterisk in B units, wherein it is understood that each asterisk is located at the end of a partial bond. Thus, as an example, A-* bonded with B—* results in A-B (i.e., the two partial bonds ending in asterisks connect to make a full bond between A and B). The OPC generally includes at least two A units and at least one B unit. In different embodiments, the OPC may include precisely, at least, or more than two, three, four, five, or six A units and precisely, at least, or more than one, two, three, four, five, or six B units. The A units are linked to one or more B units in linear or cyclic arrangement, or a combination thereof. A linear arrangement may be, for example: C-A-B-(A-B)$_n$—C, wherein n is, for example, 1, 2, 3, 4, 5, 6, 7, 8, 9, 10, or 11, and C is an endcapping group, such as a hydrogen atom or hydrocarbon group containing 1-6 carbon atoms, as described above. A cyclic arrangement may be, for example:

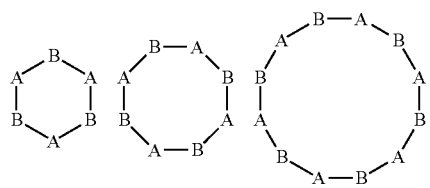

wherein any of the A and B units in a cyclic arrangement, such as any of those depicted above, may be attached to endcapping groups (C) or other A and/or B units to extend the arrangement. An example of some extended arrangements include:

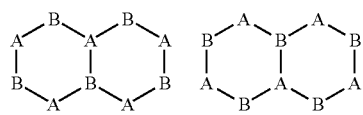

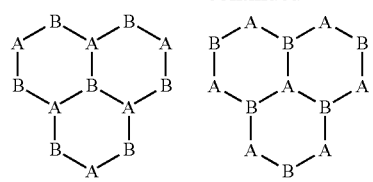

Ultimately, in the event of surplus asterisks being present, such as when A and/or B units are trivalent or higher valent, surplus asterisks will arise at the point that the structure no longer extends, and the surplus asterisks are necessarily terminated by endcapping groups (C).

Some specific examples of A units include:

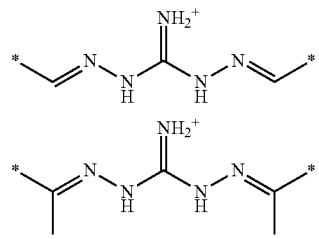

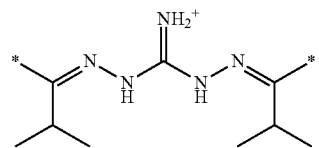

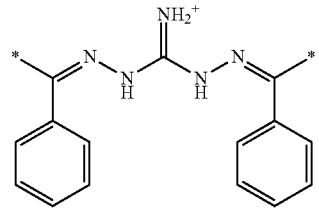

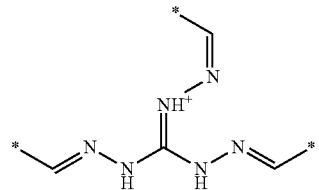

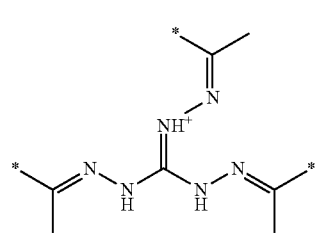

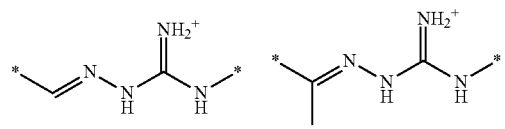

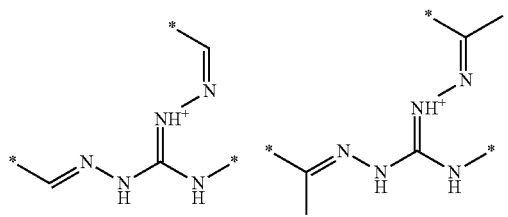
Some specific examples of B units (i.e., R linkers) include:
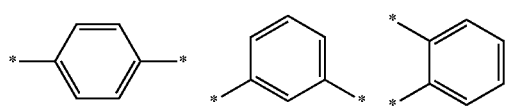
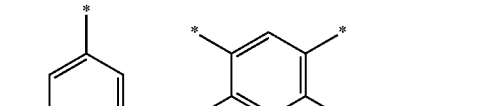
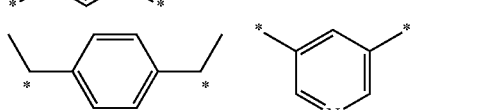
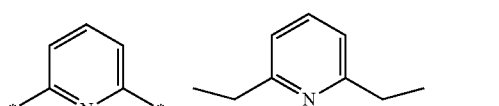
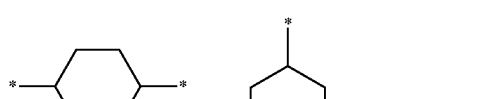
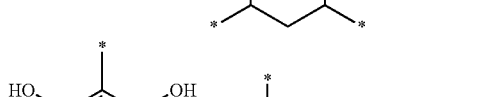
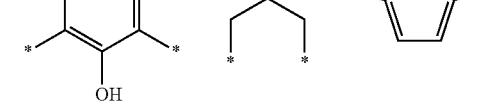
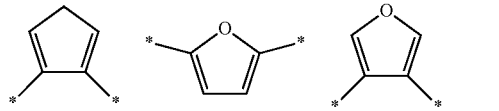
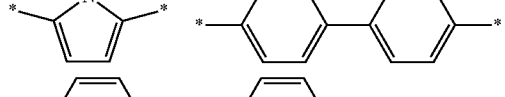
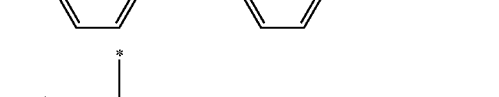
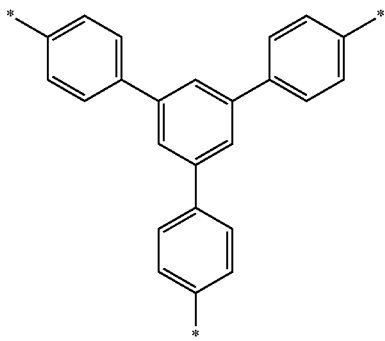
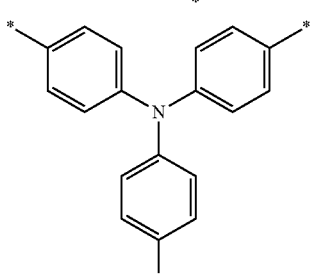
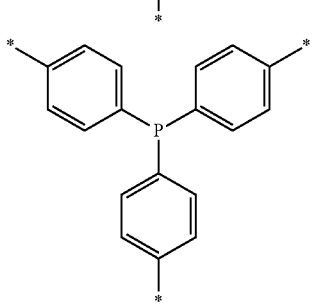
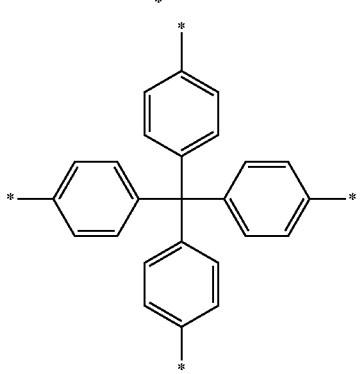
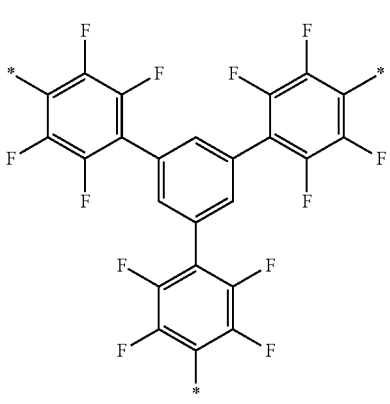

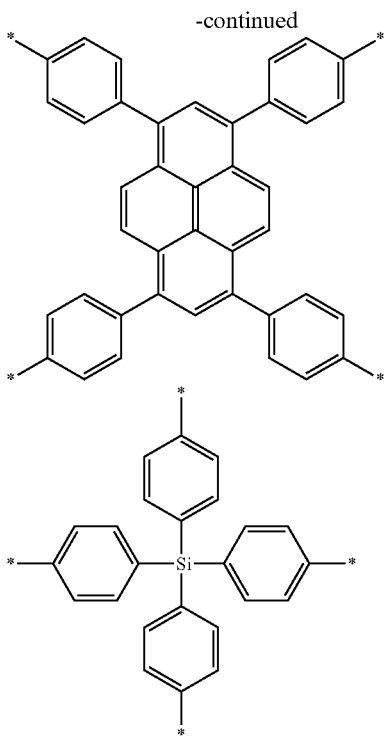

In the generic formula provided above for the B units, where R is a ring, the formula for B units is intended to include any regioisomers that may differ in the connection points of the A units to R. Thus, as an example, if R is taken as a benzene (phenylene) ring, A units may be connected at the 1,4 (para), 1,3 (meta) or 1,2 (ortho) positions. In some embodiments, the A units are located the farthest from each other on the ring-containing moiety. In the case of a benzene ring, the farthest positions correspond to the 1,4 (para) positions or 1,3,5 positions. In the event that the structure of one or more A units possesses one or more stereocenters, the structure of the A units is intended to include all resulting stereoisomers. The stereoisomer may include one or more enantiomers and/or diastereomers.

The OPC containing interconnected A and B units, as set forth above, also includes an anionic species $X^{m-}$ with a magnitude of charge m of at least 1, wherein the sum of negative charge provided by anionic species $X^{m-}$ counterbalances the total positive charge provided by the A units. The variable m is typically 1 or 2, but may or may not be 3 or 4 or higher, depending on the anion. The anionic species may be any anionic species that, when complexed as a salt with the OPC, can be exchanged for another anionic species desired to be removed from an aqueous solution. As the different anionic species have different dissociation constants, any anionic species may be useful in exchanging with another anionic species to be removed from an aqueous source. The anionic species may also represent a species that has been removed from an aqueous solution, wherein the resulting salt of the absorbed anion and OPC is valuable as a precursor for producing a neutral form of the OPC or by exchanging with another anionic species that can be used to exchange with and remove another anionic species of interest.

The anionic species ($X^{m-}$) can be, for example, a halide, such as fluoride, chloride, bromide, or iodide. The anionic species can alternatively be a halide equivalent (or pseudohalide), such as methanesulfonate (mesylate), trifluoromethanesulfonate (triflate), tosylate, cyanate, thiocyanate, cyanide, or a sulfonamide anion, such as bis(trifluoromethane) sulfonamide (i.e., bistriflimide). The anionic species may alternatively be a borate anion, such as tetrafluoroborate, tetrakis(pentafluorophenyl)borate, or tetrakis[3,5-bis(trifluoromethyl)phenyl]borate. The anionic species may alternatively be hexafluorophosphate ($PF_6^-$). The anionic species may alternatively be hydroxide, or an alkoxide (e.g., methoxide or ethoxide). The anionic species may alternatively be a carboxylate species, such as formate, acetate, propionate, or glycolate. The anionic species may alternatively be a perfluoroalkylsulfonic acid or perfluoroalkylcarboxylic acid.

In other embodiments, the anionic species ($X^{m-}$) can be an oxoanion, such as a tetrahedral or trigonal oxoanion, although complexation with tetrahedral oxoanions is more typical in the present disclosure. As used herein, the term "oxoanion" refers to an anion having at least three or four oxygen atoms, wherein the oxygen atoms are generally all bound to a central element. In some embodiments, the oxoanion contains only oxo ($O^{2-}$) ions bound to a central element, while in other embodiments, the oxoanion may include one or more hydroxy (OH) groups bound to a central element. Some examples of tetrahedral oxoanions include chromate (e.g., $CrO_4^{2-}$, $HCrO_4^-$, or $Cr_2O_7^{2-}$), arsenate ($AsO_4^{3-}$), hydrogen arsenate ($HAsO_4^{2-}$), perrhenate ($ReO_4^-$), pertechnetate ($TcO_4^-$), selenate (e.g., $SeO_4^{2-}$), sulfate (e.g., $SO_4^{2-}$), molybdate ($MoO_4^{2-}$), tungstate ($WO_4^{2-}$), perchlorate ($ClO_4^-$), perbromate ($BrO_4^-$), periodate ($IO_4^-$), and phosphate (e.g., $PO_4^{3-}$). Some examples of trigonal oxoanions include nitrate ($NO_3^-$), carbonate ($CO_3^{2-}$), bicarbonate ($HCO_3^-$), bromate ($BrO_3^-$), and iodate ($IO_3^-$). The oxoanions provided above may or may not also include related derivatives. For example, unless otherwise stated, the term "sulfate" may also include thiosulfate ($S_2O_3^{2-}$), bisulfate ($HSO_4^-$), and sulfite ($SO_3^{2-}$). Similarly, the term "chromate" may also include $Cr_2O_7^{2-}$ (dichromate). Similarly, the term "phosphate" may also include hydrogenphosphate ($HPO_4^{2-}$), dihydrogenphosphate ($H_2PO_4^-$), pyrophosphate ($P_2O_7^{4-}$), thiophosphates (e.g., $PO_3S^{3-}$ or $PO_2S_2^{3-}$), and phosphite (e.g., $PO_3^{3-}$, $HPO_3^{2-}$, or $H_2PO_3^-$). The oxoanion may also be selected from among less typical species, such as vanadates, tellurates, stannates, plumbates, niobates, zincates, aluminates, silicates, and large clusters of these or other oxoanions that may possess a large overall negative charge (e.g., a polyoxometalate, such as a phosphotungstate anion, such as $PW_{12}O_{40}^{3-}$, or a phosphomolybdate, such as $PMo_{12}O_{40}^{3-}$, or other complex polyoxometalate, such as $(CeO_8)W_{10}O_{28}^{8-}$ or $(UO_{12})Mo_{12}O_{30}^{8-}$). Notably, any of the above anionic species may be a species removed from a water source by contact of the water source with the above-described OPC, the methodology of which is discussed in detail below.

In one set of embodiments, the OPC is non-porous. In another set of embodiments, the OPC is porous. In the case of a porous OPC, the pores may be nanopores (e.g., micropores and/or mesopores) or macropores. As used herein and as understood in the art, the term "micropores" refers to pores having a size less than 2 nm. In different embodiments, the micropores can have a size of precisely, about, up to, or less than, for example, 0.1, 0.2, 0.5, 0.8, 1, 1.2, 1.5, 1.8, or 2 nm, or a size within a range bounded by any two of the foregoing values. As used herein and as understood in the art, the term "mesopores" refers to pores having a diameter (i.e., pore size) of 2 to 50 nm. In different embodiments, the mesopores can have a size of precisely or about, for example, 2, 5, 8, 10, 12, 15, 18, 20, 25, 30, 35, 40, 45, or 50 nm, or a size within a range bounded by any two of the foregoing values. In some embodiments, the nanopores are larger than mesopores, e.g., above 50 nm, or at least or up to 100 nm, 150 nm, 200 nm, or 500 nm. Macropores, if present, generally refer to pores having a size of at least 1 micron. In some cases, only micropores are present or only mesopores are present, or micropores and mesopores are both present, i.e., in a pore size range having a micropore size as lower bound and mesopore size as upper bound (e.g., 1-50 nm or 1-20 nm or 1-10 nm). In some embodiments, macropores are excluded. In other embodiments, select portions of micropores and/or mesopores (or nanopores) are excluded.

The OPCs containing interconnected A and B units, as described above, can be synthesized by methods well known in the art. In particular embodiments, the OPC is synthesized by reacting divalent or trivalent aminoguanidinium or bis(amino)guanidinium species (i.e., "A unit molecules") with a polyaldehyde B unit molecule (e.g., dialdehyde, trialdehyde, or tetraaldehyde) or polyketone B unit molecule (e.g., diketone, triketone, or tetraketone, i.e., R) under conditions where imine linkages are formed between amino groups on the aminoguanidinium or bis(amino)guanidinium molecules (of the A units) and aldehyde or ketone groups (of the B units). An exemplary schematic of the process is provided as follows:

The A unit molecules may have the following structures (with anion omitted):

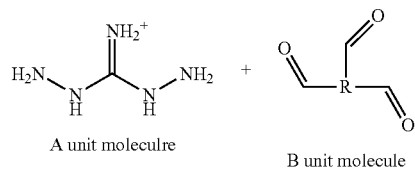

wherein R' represents a hydrocarbon linker (R), or more particularly, a hydrocarbon linker containing 1-6 carbon atoms.

Some particular examples of A unit molecules containing R' linking portions include:

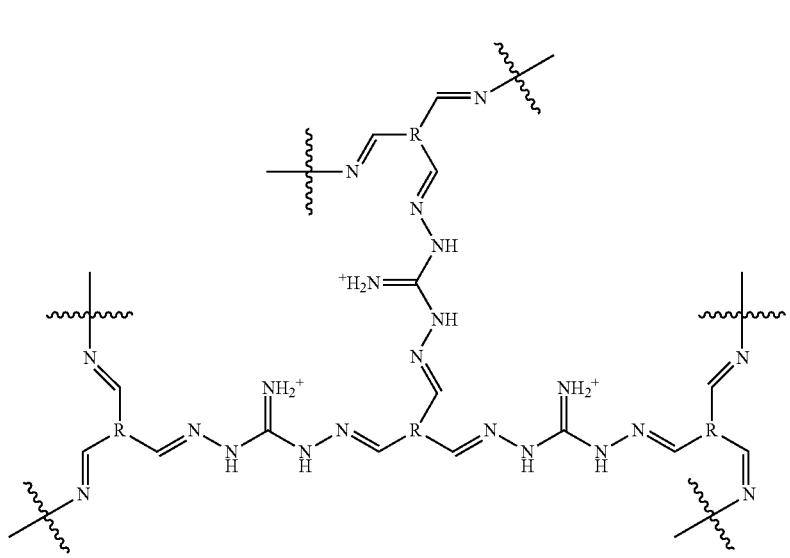

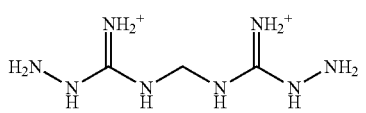

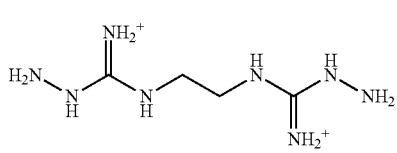

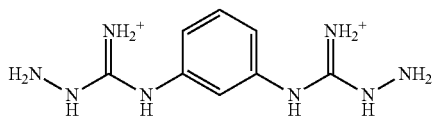

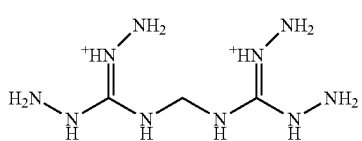

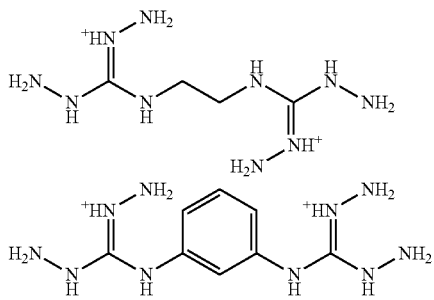

The B unit molecules can have the following generic structure:

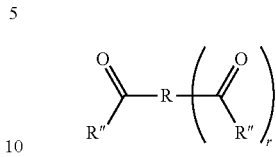

wherein R'' are independently selected from hydrogen atoms and hydrocarbon groups containing 1-6 carbon atoms, as provided for $R^1$, $R^2$, $R^3$, $R^4$, and $R^5$ groups shown in A unit species (i)-(iv); R is as defined above; and r is an integer of 1, 2, or 3, as defined in B units.

Although the above exemplified method depicts cationic A unit molecules reacting with B unit molecules to produce a cationic OPC product, the cationic OPC product can alternatively be produced by reacting neutral A unit molecules with B unit molecules to produce a neutral OPC product, followed by reacting the neutral OPC product with an acid to produce the cationic OPC product. An example of a neutral A unit molecule is as follows:

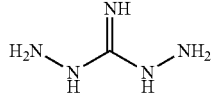

In the event that the above exemplified neutral A unit molecule is used to react with B unit molecules exemplified above, the resulting neutral OPC product may have the following structure:

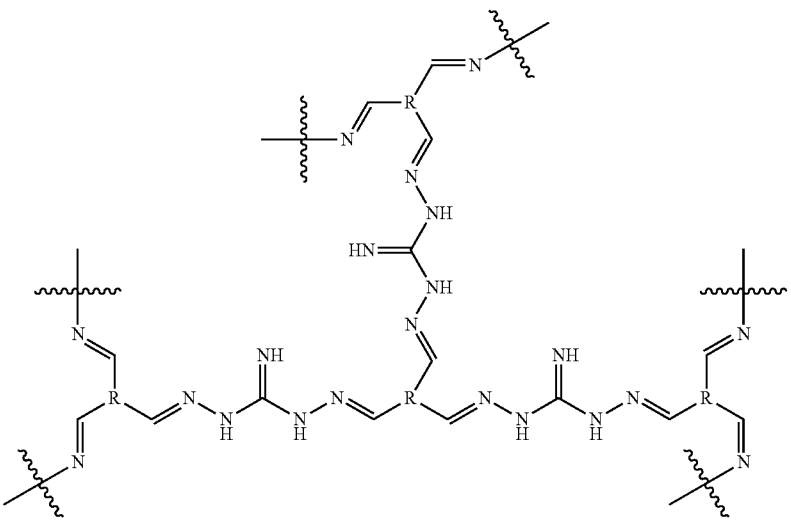

The neutral OPC products can contain any of the following neutral A units (interconnected with B units, as already provided above):

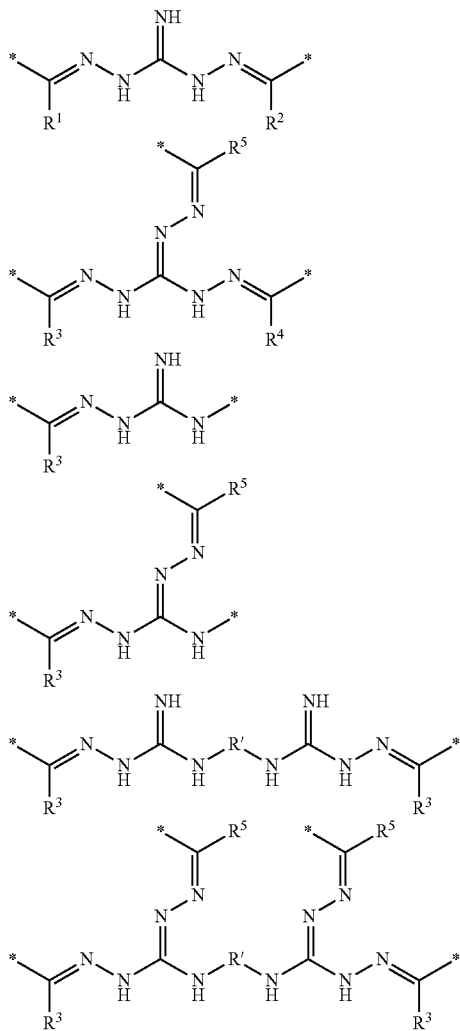

In another aspect, the invention is directed to a method for removing one or more oxoanions from an aqueous source containing the one or more oxoanions by contact of the aqueous source with any of the organic polymer compositions (OPCs) described above, wherein the anionic species ($X^{m-}$) in the OPC, before contact with the aqueous source, is exchangeable with the one or more oxoanions to be removed from the aqueous source. After contact with the aqueous source and after exchange has taken place, at least a portion of the anionic species ($X^{m-}$) in the OPC is one or more of the oxoanions from the aqueous source. In some embodiments, the anionic species in the OPC, before contact with the aqueous source, is more specifically a halide or pseudohalide. The oxoanion(s) in the aqueous source can be one or more of any of the oxoanions described earlier above. The aqueous source can be any source containing one or more oxoanions to be removed, i.e., absorbed into the OPC. The oxoanion to be removed is generally dissolved or suspended in the aqueous source. In some embodiments, one or more of the oxoanions may be in the form of an insoluble scale, such as $CaSO_4$, $SrSO_4$, or $BaSO_4$ scale, as often encountered in oil field injection operations. The aqueous medium is typically composed predominantly or completely of water, such as found in seawater, aqueous effluent from an industrial or commercial process, or water from sewage treatment. However, in some embodiments, the aqueous medium may include an organic solvent miscible in water, such as an alcohol, acetone, or the like.

In a first step of the method for removing one or more oxoanions from an aqueous source, i.e., "step (i)," the OPC (such as any one or more of the OPCs described above containing interconnected A and B units) is contacted with the aqueous source by any suitable means that permits the one or more oxoanions in the aqueous source to be absorbed into the OPC to result in an oxoanion-containing OPC. The OPC, before and after contact with the aqueous source, is generally insoluble in the aqueous source. In one particular embodiment, the OPC is contacted with the aqueous source by passing the aqueous source solution through a column containing the OPC. In another particular embodiment, the OPC is contacted with the aqueous source by adding the OPC to the aqueous source solution, and agitating the aqueous source solution containing the OPC to result in the oxoanion-containing OPC. The OPC is typically in particulate form (e.g., micron-sized or millimeter-sized) particles when used; however, in some embodiments, the OPC may have a single monolithic shape of macroscale dimension, such as a sponge or mesh having at least one dimension at least 1 cm in size.

In a second step of the method, the oxoanion-containing OPC is separated from (i.e., removed from) the aqueous source that was processed (i.e., depleted in one or more oxoanions). In the case of the first step entailing passing the aqueous source through a column containing the OPC, the second step occurs simultaneously with the first step, since passage of the aqueous source through the OPC-filled column results in formation of an effluent (i.e., the processed aqueous source), which is separate from the OPC in the column. In the case of the first step entailing addition of the OPC to the aqueous source solution followed by agitation, the OPC may be separated from the processed aqueous solution by means well known in the art, such as filtration. The column flow or filtration is typically gravity-fed, i.e., a top-to-bottom flow (i.e., down-flow) operation; however, the column flow or filtration may, in some embodiments, be a bottom-to-top flow (i.e., upflow) operation in which forced flow (e.g., by means of a pump) is employed.

The one or more oxoanions in the aqueous source may be selected from any of the oxoanions already described above. In some embodiments, the aqueous source contains one or more tetrahedral oxoanions, such as one or more selected from chromate, arsenate, perrhenate, pertechnetate, selenate, sulfate, molybdate, tungstate, perchlorate, perbromate, periodate, and phosphate, wherein one or more tetrahedral oxoanions may or may not be in the presence of one or more trigonal oxoanions, such as one or more selected from nitrate, carbonate, bicarbonate, bromate, and iodate.

Notably, the OPCs described herein have been surprisingly found to selectively absorb tetrahedral oxoanions over trigonal anions. Typically, before contact of the OPC with the aqueous source, the OPC contains the anionic species ($X^{m-}$) as a halide or pseudohalide. In the starting OPC, the anionic species ($X^{m-}$), when taken as a halide or pseudohalide, has been found to be readily exchangeable with a range of oxoanions, although the possibility remains that the starting anionic species, before contact with the aqueous source, may be other than a halide or pseudohalide (e.g., sulfate or carbonate) provided that the non-halide is exchangeable with the other one or more oxoanions to be removed from the aqueous source. The OPCs described herein have been found to be particularly selective for chromate, arsenate, perrhenate, and pertechnetate. In the event that the aqueous source contains any one or more of chromate, arsenate (or hydrogen arsenate), molybdate, perrhenate, and pertechnetate along with other oxoanions (e.g., sulfate, selenate, or phosphate), the OPC will generally selectively remove one or more of chromate, arsenate, molybdate, perrhenate, and pertechnetate over the one or more other oxoanions. In the event that the aqueous source contains two or more of chromate, arsenate, molybdate, perrhenate, and pertechnetate, the OPC will generally selectively remove chromate, or chromate and molybdate, or chromate, molybdate, and arsenate, over the other oxoanions.

By use of the OPCs described herein, the oxoanion salt being removed can be reduced by at least or above 98%, 99%, 99.5%, or 99.9% compared to the original concentration of the oxoanion in the aqueous source. Generally, the OPC is added to the aqueous source in an amount corresponding to at least, and generally above, the molar amount of oxoanion expected to be contained within a sample of aqueous source being processed. The OPCs described herein are typically capable of ion-exchange uptake capacities of at least or above 50, 60, 70, 80, 90, 100, 120, 150, 180, or 200 mg/g depending on the pH of the medium, e.g., at a pH of 4-10, or 5-9, or 6-8, or about 7.

In the process described above for removing one or more oxoanions from an aqueous source, the resulting oxoanion-containing OPC can be conveniently further processed to regenerate the starting OPC, which may be referred to as "step (iii)". By regenerating the starting OPC, the process can advantageously include a recycling step, which makes the process further cost effective with minimal environmental impact. To regenerate the starting OPC, the oxoanion-containing OPC can be reacted with a base (e.g., a metal hydroxide, organic amine, or ammonia) to remove protons from the OPC to convert the cationic form of the OPC to the neutral form while at the same time forming (and releasing) an exchange salt formed from the oxoanion and cationic species from the base. For example, in the case where the OPC contains chromate anion, the OPC-chromate complex can be reacted with NaOH or $NH_3$ to form neutral (deprotonated) OPC and sodium chromate or ammonium chromate, respectively. The neutral OPC can then be reacted with a protic acid (e.g., HCl, HBr, or $HNO_3$, etc.) to produce the original cationic (re-protonated) form with $X^{m-}$ being the conjugate base of the acid used (e.g., $Cl^-$, $Br^-$, or $NO_3^-$, respectively). Notably, as the oxoanion-containing exchange salt formed on neutralization of the OPC is typically soluble in water, the exchange salt can generally be separated by facile means from the neutralized OPC to result in a process wherein one or more oxoanions of interest are removed from the aqueous source while regenerating the OPC for further use.

Examples have been set forth below for the purpose of illustration and to describe certain specific embodiments of the invention. However, the scope of this invention is not to be in any way limited by the examples set forth herein.

EXAMPLES

Synthesis of a Guanidinium-Containing Organic Polymer Composition ($BT-DG_{Cl}$)

Figure 1B:
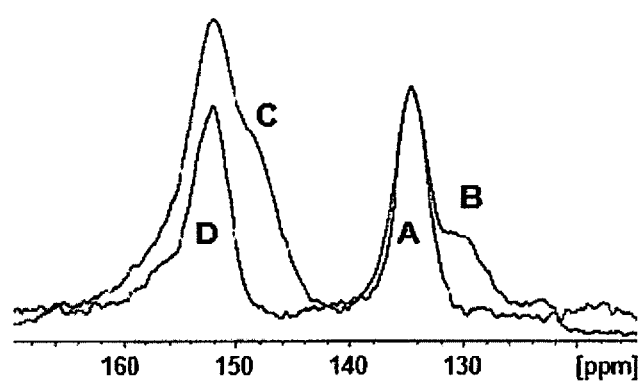

A novel OPC herein referred to as $BT-DG_{Cl}$ was synthesized in accordance with the synthetic scheme shown in FIG. 1A. $BT-DG_{Cl}$ was synthesized solvothermally in one step via the polycondensation reaction of benzene-1,3,5-tricarbaldehyde (BT), trigonal building block, and diaminoguanidinium (DG) chloride, linear strut, in water-dioxane mixture at 120° C., forming strong imine linkages between the units. This particular combination of building blocks was chosen to favor the formation of 2D sheets, in which the guanidinium groups are located on the edges of the hexagonal pores, ideally providing functionalized one-dimensional channels that penetrate throughout the three-dimensional structure (FIG. 1A, right). The complete consumption of the starting materials was confirmed by Fourier-transform infrared spectroscopy (FT-IR). The C=O carbonyl stretching band of the aldehyde at 1680 $cm^{-1}$ disappeared in the spectrum and was replaced with a new band at 1600 $cm^{-1}$, corresponding to newly formed imine C=N bonds. Additionally, the aldehyde carbon peak was not detected in the $^{13}C$ cross-polarization/magic angle spinning (CP/MAS) NMR spectrum of $BT-DG_{Cl}$, which confirms the complete conversion of starting materials into an imine-bonded framework. The $^{13}C$ cp and cppi MAS solid-state NMR spectra of $BT-DG_{Cl}$ spun at 5 kHz is shown in FIG. 1B. Spectral overlay of the cross-polarization with polarization inversion (CPPI) spectrum, in which $CH_0$ appear positive and $CH_1$ are null, with $^{13}C$ CP/MAS NMR spectrum revealed that the peak at ~152 ppm corresponds to guanidinium carbons (D); shoulder at ~149 ppm corresponds to imine carbons (C); signal at ~135 ppm matches with quaternary aromatic carbons (A); and shoulder at ~130 ppm—to phenyl carbons (B). In FIG. 1B, A indicates cppi, phenyl carbons ($CH_0$); B indicates cp, phenyl carbons ($CH_1$); C indicates cp, imine carbons; and D indicates cppi, guanidinium carbons. The elemental composition of the OPC was confirmed by elemental analysis and matched well with the theoretical value for infinite 2D sheets. Based on the elemental composition, the overall anion exchange capacity was estimated to be 4.3±0.3 mequiv per gram of dry $BT-DG_{Cl}$, one of the highest values among anion exchange resins and natural sorbents.

In order to maintain the charge neutrality in the ionic porous framework, two chloride ions in $BTDG_{Cl}$ need to be exchanged with one divalent oxoanion. In other words, the theoretical capacity of material for divalent anions would be equal to only half of the total chloride content in the $BT-DG_{Cl}$, i.e. ~2.2±0.2 mequiv/g. In the $BT-DG_{Cl}$ framework, a rapid and complete exchange of chloride ions with sulfate ions took place in less than 10 minutes, which indicates an accessibility of the exchange sites. Upon addition of $BTDG_{Cl}$ to $Na_2CrO_4$ solution, an ion exchange process resulted in a concomitant color change of the material from yellow to dark brown.

Figure 2A:
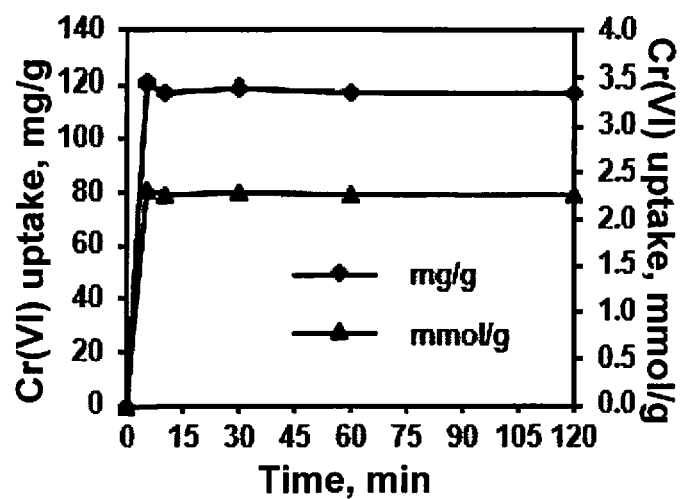
FIGS. 2A-2F elucidate the ability of BT-DG$_{Cl}$ to absorb (remove) various anions.

As can be clearly seen from the time-dependent uptake isotherm presented in FIG. 2A, Cr(VI) removal by $BT-DG_{Cl}$ required less than 5 minutes to attain equilibrium. The maximum uptake capacity of Cr(VI) was determined by keeping the amount of $BT-DG_{Cl}$ constant and changing the initial concentration of Cr(VI) in the aqueous solution.

Figure 2B:
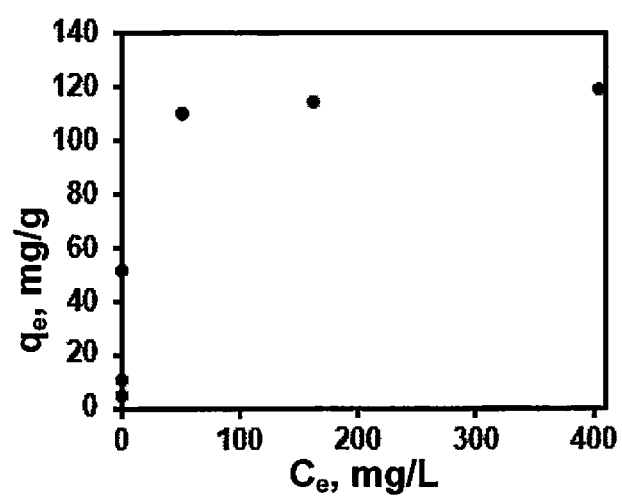

FIG. 2B shows the uptake isotherm of $BT-DG_{Cl}$. The results depicted in FIG. 2B reveal a sharp increase at low Cr(VI) concentrations, reaching the maximum uptake capacity of ~120 mg/g at an initial solution pH of 7.

Figure 2C:
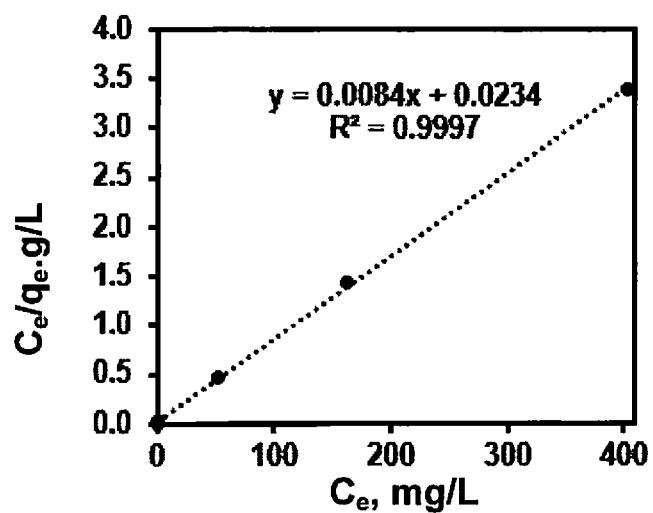

The data in FIG. 2B were used to plot FIG. 2C as well. FIG. 2C is a linear regression plot using the Langmuir adsorption model. The results obtained from uptake capacity versus Cr(VI) concentration plot (FIG. 2B) fitted well with Langmuir model ($R^2>0.999$), consistent with a site-wise exchange of Cr(VI) oxoanions.

Figure 2D:
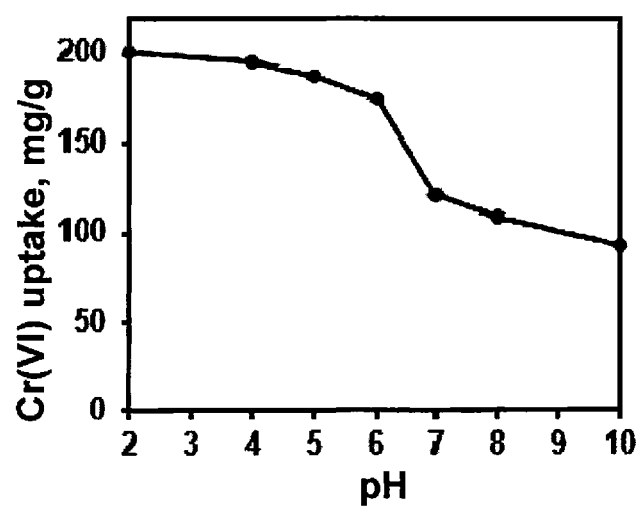

FIG. 2D is a plot showing the effect of the initial pH on the Cr(VI) removal by BT-DG$_{Cl}$; dose of 5 g/L; T=25C; $C_{CR(VI)}$=20 mM; time=10 minutes. Significantly improved Cr(VI) removal efficiency was observed by BTDG$_{Cl}$ at low pH (FIG. 2D), reaching 200 mg/g (3.8 mequiv/g). On the one hand, this observed trend can be explained by examining the distribution of Cr(VI) species in solution, which is dependent on Cr(VI) concentration and the pH. At a pH below 6.5, monovalent bichromate ion (HCrO$_4^-$) is the predominant Cr(VI) form present in aqueous medium. As a consequence, the removal of monoanionic Cr(VI) species by BT-DG$_{Cl}$ at low pH correlates well with the observed higher adsorption capacities. On the other hand, with increasing the pH, two processes contribute to decreasing the adsorption capacity of ionic adsorbent: the major Cr(VI) species in solution at high pH values are divalent chromate ions (CrO$_4^{2-}$) and a number of surface charges in BT-DG$_{Cl}$ decreases with increasing pH value of the aqueous phase due to partial deprotonation of the guanidinium ions present in the framework, leading to a diminished Cr(VI) removal capacity by BT-DG$_{Cl}$. Nonetheless, the exchange capacity of Cr(VI) as CrO$_4^{2-}$ in BTDG$_{Cl}$ remains high (>90 mg/g) even at the initial pH values of aqueous solution as high as 10.

Figure 2E:
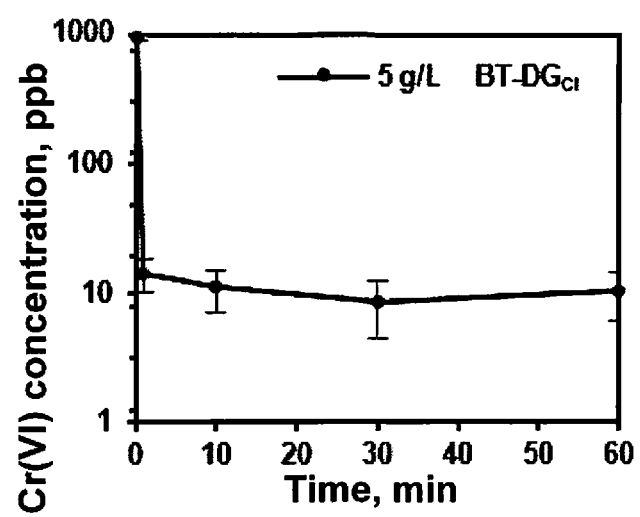

Rapid decontamination of water from toxic metal ions was achieved by treating aqueous solution containing high concentration of Cr(VI) with BT-DG$_{Cl}$. The data in FIG. 2E shows the effect on the contact time on the Cr(VI) removal by BT-DG$_{Cr}$: initial pH=7; dose 5 g/L; T=25° C.; Cr(VI)=1 ppm. As shown in FIG. 2E, after contacting the BT-DG$_{Cl}$ with chromate-laced water for only 1 minute, the Cr(VI) concentration decreased from the initial 1 ppm to 10 ppb level—a hundred fold reduction, which is an order of magnitude below the current US Environmental Protection Agency (EPA) maximum contaminant level for total chromium concentration of 100 ppb.

Figure 2F:
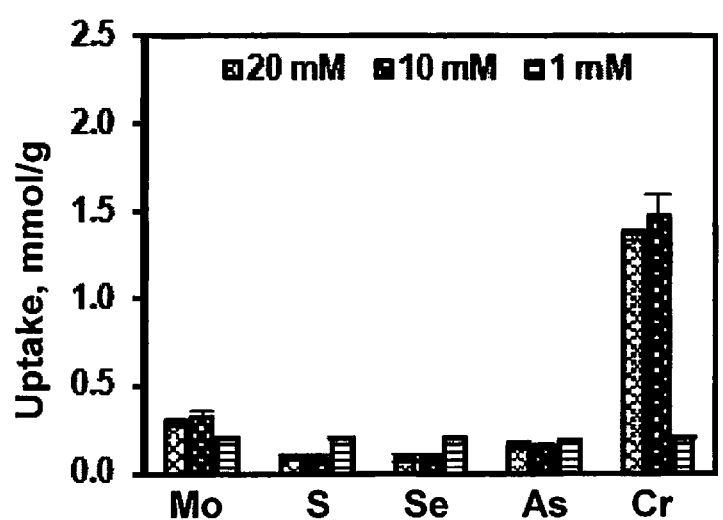

Notably, BT-DG$_{Cl}$ shows an affinity towards Cr(VI) oxoanions even in the presence of competing oxoanions. The data in FIG. 2F shows the effect of the concentration of different oxoanions on the removal of Cr(VI) by BT-DG$_{Cl}$: initial pH=7; dose 5 g/L; T=25° C.; $C_M$=20, 10, 1 mM each; time=10 min. As shown in FIG. 2F, when the total oxoanion concentration in aqueous solution exceeds the total exchange capacity of the sorbent (left and middle bars in each set in FIG. 2F), the sorbent affinity towards the oxoanions follows the order: Cr(VI)>>Mo(VI)>As(V)>Se(VI)>S(VI). It is worth noting that at a very low combined oxoanion concentration, when the concentration of oxoanions is significantly lower than the exchange capacity of sorbent, the BT-DG$_{Cl}$ indiscriminately and quantitatively removes all five oxoanions from the aqueous solution (rightmost bar in each set in FIG. 2F). Additionally, the ability of BT-DG$_{Cl}$ to selectively remove Cr(VI) species from a contaminated drinking water sample that contained naturally-occurring concentrations of NO$_3^-$, CO$_3^{2-}$, and SO$_4^{2-}$ ions was also tested. All but trigonal nitrate ions were quantitatively removed by BT-DG$_{Cl}$. The above results suggest that BT-DG$_{Cl}$ possesses an extraordinary affinity and selectivity towards oxoanions and can surprisingly differentiate oxoanions based on their geometry (tetrahedral vs. trigonal), and, among all of the anions tested, shows the greatest selectivity towards chromium(VI) oxoanions.

Figure 1C:
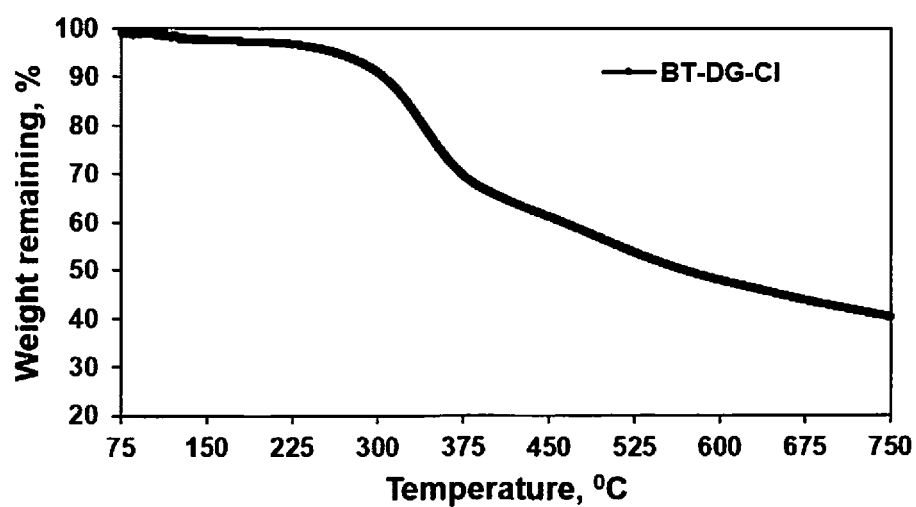

Surprisingly, the Brunauer-Emmett-Teller (BET) surface area measured for activated BT-DG$_{Cl}$ sample appeared to be only ~3 m$^2$/g, which is relatively low. Such a low surface area may be explained by taking into consideration the poor directional control of diaminoguanidinium groups used in BT-DG$_{Cl}$ synthesis, resulting in a disordered structure and smaller-sized pores. Despite this, the performance of BT-DG$_{Cl}$ in the removal of Cr(VI) from streams is remarkable. Rapid access by oxoanions to the exchangeable sites in the framework suggests the presence of hydrated nano-channels. As implied, BT-DG$_{Cl}$ rapidly absorbs water when exposed to moist air at 100% relative humidity. The maximum water uptake was measured to be 25% by weight, which corresponds to approximately three molecules of water per ionic site. Most of the water from hydrated BT-DG$_{Cl}$ can be removed by drying the sample at 70° C. under vacuum. Thermogravimetric analysis (TGA), as performed on a vacuum-dried sample of BT-DG$_{Cl}$, demonstrated that this material is thermally stable up to 250° C. under nitrogen (FIG. 1C). In addition, the powder X-ray diffraction (PXRD) analysis revealed low crystallinity of BT-DG$_{Cl}$, the major broad peak at 2θ=27 being consistent with vertical stacking of 2D sheets. This could be due to the presence of repulsive interactions between the positively charged guanidinium groups, combined with the necessity to accommodate chloride counterions.

Figure 3:
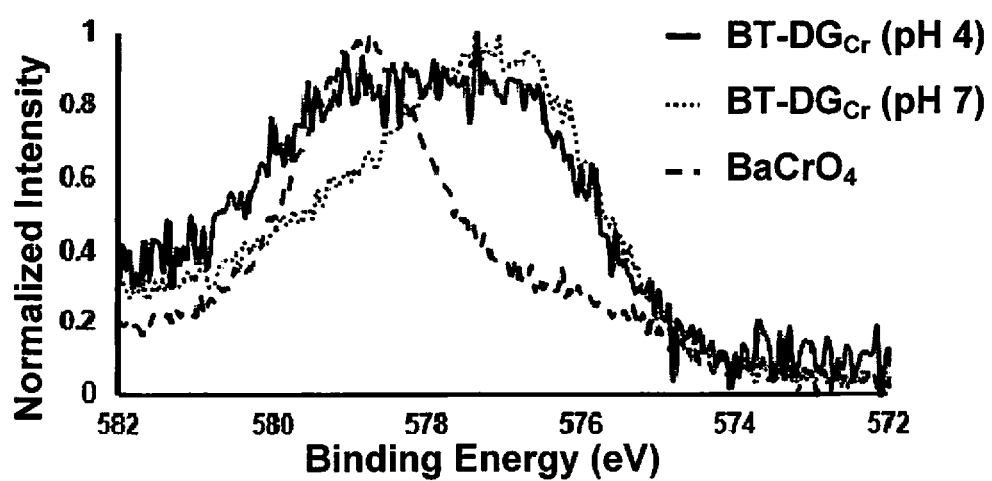
FIG. 3 shows XPS spectra of BT-DG$_{Cr}$, prepared at initial pH=4 and 7, and control substrate, BaCrO$_4$.

In order to gain a deeper understanding of the oxidation state of chromium present in the near-surface regions of chromate-loaded BT-DG, X-ray photoelectron spectroscopy (XPS) analysis was performed. The Cr 2p$_{3/2}$ XPS data for BT-DG$_{Cr}$ and BaCr$^{VI}$O$_4$ standard are plotted in FIG. 3. The data obtained for BT-DG$_{Cr}$ exhibits a mixture of a high binding energy (~578.5 eV) and lower binding energy (~576.6 eV) feature that corresponds to Cr(VI) and Cr(III), respectively. The relative fraction of Cr(III) in the framework increases in more basic pH solution mixtures. This may indicate that the drying of the sample needed to perform the XPS measurements may change the reduction potential of the local environment of BT-DG$_{Cr}$ since Cr(III) compounds (i.e., Cr$_2$O$_3$ and Cr(OH)$_3$) are not water soluble. The analysis of the sodium chromate solution at pH 7, prior to the exposure to BT-DG$_{Cl}$, indicated a presence of only Cr(VI) species.

While a nearly quantitative (>95%) stripping of chromium species from BT-DG$_{Cr}$ using aqueous base was observed, the resulting neutral material (BT-DG) retained a slightly greenish color, which is indicative of Cr(III) species and likely represents the remaining <5% of chromium present in the framework. The pivotal diiminoguanidinium ion present in the OPC structure is more than 4 orders of magnitude more acidic (pKa ~8.4) than the unsubstituted guanidinium ion (pKa=13.6). Strong base, such as 0.1 M sodium hydroxide (NaOH), rapidly deprotonates the diiminoguanidinium sites within the framework, converting them into neutral guanidines, and thus resulting in concomitant release of Cr(VI) oxoanions in the aqueous solution. The analysis of the recovered sodium chromate solution revealed that the released chromium from BT-DG$_{Cr}$ mostly resides in its +6 oxidation state with only a small amount of Cr(III) present. The neutral material (BT-DG) can be readily converted back into its cationic form (BT-DG$_{Cl}$) by simply treating the neutral framework with dilute hydrochloric acid (HCl), thus permitting it to be deployed for further Cr(VI) sequestration, and repeating the regenerative process over any number of cycles. The FT-IR spectra of the regenerated and freshly synthesized BT-DG$_{Cl}$ were indistinguishable, which indicates good stability of the framework under basic and acidic conditions. The uptake capacity of Cr(VI) oxoanions by the regenerated BT-DG$_{Cl}$ matched closely with the initial uptake values. Fast and nearly quantitative release of chromium species in the aqueous phase upon neutralization of BT-DG$_{Cr}$ suggests that the framework is initially loaded with Cr(VI) species, and that a small amount of Cr(VI) is being reduced to Cr(III) within the framework upon exposure to heat.

In summary, the above experiments demonstrated the utility of a novel OPC, namely BT-DG$_{Cl}$, that rapidly, within one minute, removes toxic Cr(VI) oxoanions from aqueous solutions. BTDG$_{cl}$ operates predominantly by the ion-exchange mechanism and the presence of a high concentration of diiminoguanidinium groups in the framework gives rise to the exceptional removal efficiency of oxoanions. Among seven different anions tested, the BT-DG$_{cl}$ showed the highest selectivity towards Cr(VI) oxoanions and was able to distinguish tetrahedral oxoanions from trigonal planar oxoanions.

While there have been shown and described what are at present considered the preferred embodiments of the invention, those skilled in the art may make various changes and modifications which remain within the scope of the invention defined by the appended claims.

What is claimed is:

1. An organic polymer composition comprising the following structure:

A units:

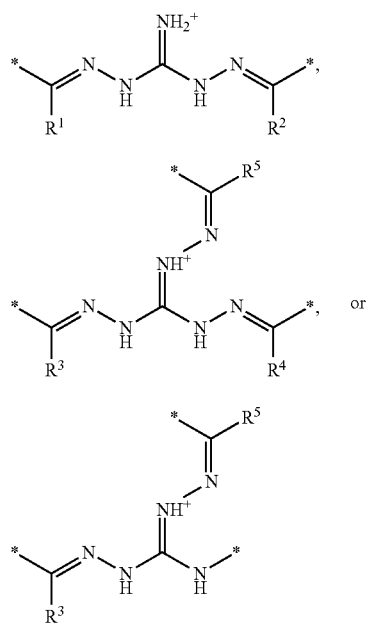

*—R—(*)$_r$          B units:

wherein:
the composition includes at least two A units and at least one B unit;
each asterisk (*) in the at least two A units denotes a connection point with an asterisk in the at least one B unit, provided that, in the event of surplus asterisks being present, the surplus asterisks are terminated by endcapping groups;
R is a hydrocarbon linking group containing at least one carbon atom;
the R$^1$, R$^2$, R$^3$, R$^4$, and R$^5$ groups are independently selected from hydrogen atoms and hydrocarbon groups containing 1-6 carbon atoms;
r is an integer of 1, 2, or 3; and the composition necessarily includes an anionic species X$^{m-}$ with a magnitude of charge m of at least 1, wherein the sum of negative charge provided by anionic species X$^{m-}$ counterbalances the total positive charge provided by the at least two A units.

2. The composition of claim 1, wherein the organic polymer composition comprises at least three A units and at least two B units.

3. The composition of claim 1, wherein R is a ring-containing moiety.

4. The composition of claim 3, wherein at least one ring in the ring-containing moiety is an aromatic ring.

5. The composition of claim 4, wherein the aromatic ring is a benzene ring.

6. The composition of claim 1, wherein the organic polymer composition is porous.

7. The composition of claim 6, wherein the organic polymer composition possesses nanopores.

8. The composition of claim 7, wherein the nanopores have a size within a range of 1-20 nm.

9. The composition of claim 1, wherein r is 2 or 3.

10. The composition of claim 1, wherein the R$^1$, R$^2$, R$^3$, R$^4$, and R$^5$ groups are hydrogen atoms.

11. The composition of claim 1, wherein the at least two A units have the formula:

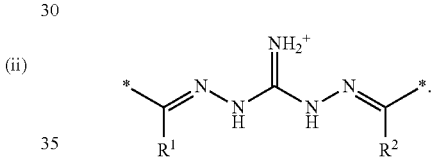

12. A method for removing an oxoanion from an aqueous source containing said oxoanion, the method comprising:
(i) contacting the aqueous source with an organic polymer composition to result in absorption of the oxoanion into the organic polymer composition to produce an oxoanion-containing organic polymer; and
(ii) removing the oxoanion-containing organic polymer from the aqueous source;
wherein the organic polymer composition comprises the following structure:

A units:

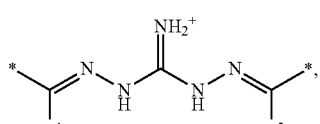

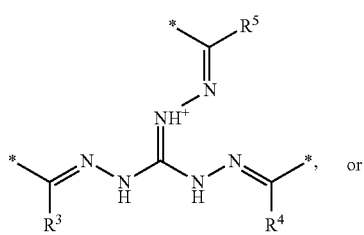

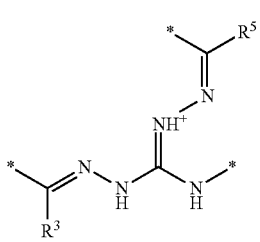

*―R―(*)ᵣ     B units:

wherein:
the composition includes at least two A units and at least one B unit;
each asterisk (*) in the at least two A units denotes a connection point with an asterisk in the at least one B unit, provided that, in the event of surplus asterisks being present, one of the more surplus asterisks are terminated by endcapping groups;
R is a hydrocarbon linking group containing at least one carbon atom;
the $R^1$, $R^2$, $R^3$, $R^4$, and $R^5$ groups are independently selected from hydrogen atoms and hydrocarbon groups containing 1-6 carbon atoms;
r is an integer of 1, 2, or 3; and
the composition necessarily includes an anionic species $X^{m-}$ with a magnitude of charge m of at least 1, wherein the sum of negative charge provided by anionic species $X^{m-}$ counterbalances the total positive charge provided by the at least two A units, provided that $X^{m-}$ is an anionic species exchangeable with the oxoanion in said aqueous source before said organic polymer composition contacts said oxoanion in step (i), and $X^{m-}$ is said oxoanion in the oxoanion-containing organic polymer.

13. The method of claim 12, wherein the oxoanion is a tetrahedral oxoanion.

14. The method of claim 13, wherein the tetrahedral oxoanion is selected from chromate, arsenate, perrhenate, pertechnetate, selenate, sulfate, molybdate, tungstate, perchlorate, perbromate, periodate, and phosphate.

15. The method of claim 13, wherein the tetrahedral oxoanion is selected from chromate and arsenate.

16. The method of claim 15, wherein, in step (i), the chromate or arsenate is selectively absorbed in the organic polymer composition when the chromate or arsenate is in the presence of one or more other types of oxoanions.

17. The method of claim 12, further comprising: (iii) regenerating the organic polymer composition with concomitant release of the oxoanion by treating the oxoanion-containing organic polymer composition with a base to result in a deprotonated organic polymer composition, followed by re-protonation of the deprotonated organic polymer composition by treatment with an acid.

18. The method of claim 12, wherein step (i) is achieved by passing the aqueous source solution through a column containing the organic polymer composition.

19. The method of claim 12, wherein step (i) is achieved by adding the organic polymer composition to the aqueous source solution, agitating the aqueous source solution, and filtering the organic polymer composition from the aqueous source solution.

20. The method of claim 12, wherein the organic polymer composition comprises at least three A units and at least two B units.

21. The method of claim 12, wherein R is a ring-containing moiety.

22. The method of claim 21, wherein at least one ring in the ring-containing moiety is an aromatic ring.

23. The method of claim 22, wherein the aromatic ring is a benzene ring.

24. The method of claim 12, wherein the organic polymer composition is porous.

25. The method of claim 24, wherein the organic polymer composition possesses nanopores.

26. The method of claim 24, wherein the nanopores have a size within a range of 1-20 nm.

27. The method of claim 12, wherein r is 2 or 3.

28. The method of claim 12, wherein the $R^1$, $R^2$, $R^3$, $R^4$, and $R^5$ groups are hydrogen atoms.

29. The method of claim 12, wherein the at least two A units have the formula:

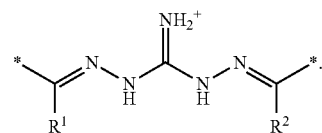

30. An organic polymer composition comprising the following structure:

A units:

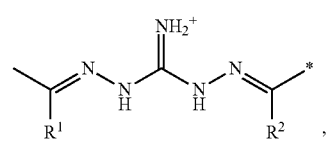

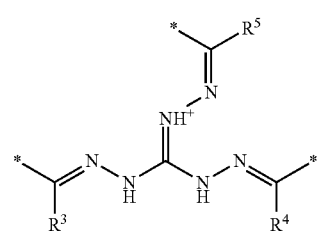

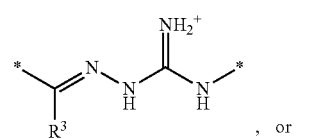

, or

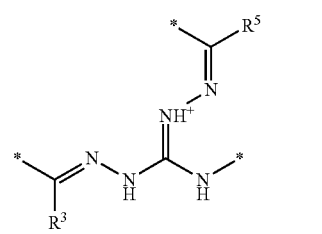

*―R―(*)ᵣ     B units:

wherein:
the composition includes at least three A units and at least two B units;

each asterisk (*) in the at least three A units denotes a connection point with an asterisk in the at least two B units, provided that, in the event of surplus asterisks being present, the surplus asterisks are terminated by endcapping groups;

R is a hydrocarbon linking group containing at least one carbon atom;

the $R^1$, $R^2$, $R^3$, $R^4$, and $R^5$ groups are independently selected from hydrogen atoms and hydrocarbon groups containing 1-6 carbon atoms;

r is an integer of 1, 2, or 3; and the composition necessarily includes an anionic species $X^{m-}$ with a magnitude of charge m of at least 1, wherein the sum of negative charge provided by anionic species $X^{m-}$ counterbalances the total positive charge provided by the at least three A units.

31. An organic polymer composition comprising the following structure:

A units:

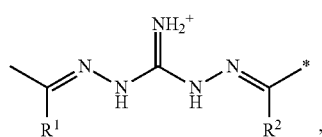

(i)

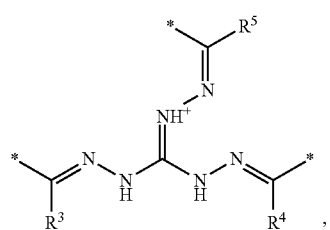

(ii)

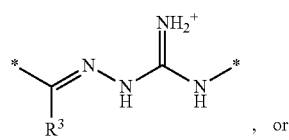

, or (iii)

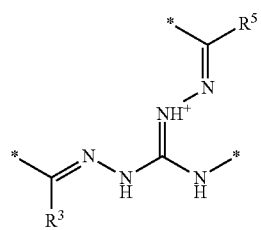

(iv)

*—R—(—*)$_r$  B units:

wherein:

the composition includes at least two A units and at least one B unit;

each asterisk (*) in the at least two A units denotes a connection point with an asterisk in the at least one B unit, provided that, in the event of surplus asterisks being present, the surplus asterisks are terminated by endcapping groups;

R has the structure —(CH$_2$)$_t$—, wherein t is at least 1 and up to 30, and each hydrogen atom is optionally and independently substituted with a methyl or ethyl group;

the $R^1$, $R^2$, $R^3$, $R^4$, and $R^5$ groups are independently selected from hydrogen atoms and hydrocarbon groups containing 1-6 carbon atoms;

r is an integer of 1, 2, or 3; and the composition necessarily includes an anionic species $X^{m-}$ with a magnitude of charge m of at least 1, wherein the sum of negative charge provided by anionic species $X^{m-}$ counterbalances the total positive charge provided by the at least two A units.

32. A method for removing an oxoanion from an aqueous source containing said oxoanion, the method comprising:

(i) contacting the aqueous source with an organic polymer composition to result in absorption of the oxoanion into the organic polymer composition to produce an oxoanion-containing organic polymer; and (ii) removing the oxoanion-containing organic polymer from the aqueous source;

wherein the organic polymer composition comprises the following structure:

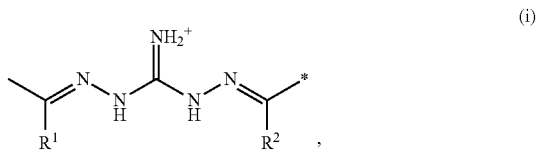

(i)

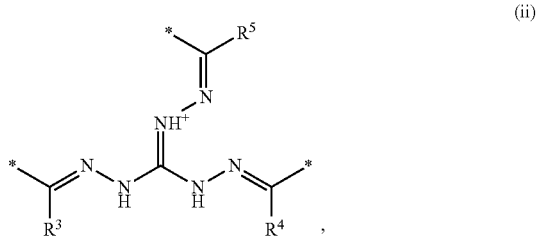

(ii)

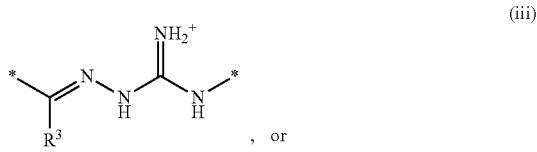

, or (iii)

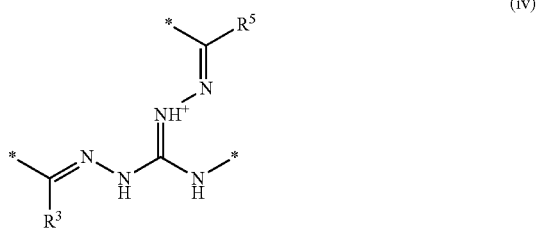

(iv)

A units:

*—R—(—*)$_r$  B units:

wherein:

the composition includes at least three A units and at least two B units;

each asterisk (*) in the at least three A units denotes a connection point with an asterisk in the at least two B units, provided that, in the event of surplus asterisks being present, one of the more surplus asterisks are terminated by endcapping groups;

R is a hydrocarbon linking group containing at least one carbon atom;

the $R^1$, $R^2$, $R^3$, $R^4$, and $R^5$ groups are independently selected from hydrogen atoms and hydrocarbon groups containing 1-6 carbon atoms;

r is an integer of 1, 2, or 3; and the composition necessarily includes an anionic species $X^{m-}$ with a magnitude of charge m of at least 1, wherein the sum of negative charge provided by anionic species $X^{m-}$ counterbalances the total positive charge provided by the at least three A units, provided that $X^{m-}$ is an anionic species exchangeable with the oxoanion in said aqueous source before said organic polymer composition contacts said oxoanion in step (i), and $X^{m-}$ is said oxoanion in the oxoanion-containing organic polymer.

33. A method for removing an oxoanion from an aqueous source containing said oxoanion, the method comprising:
(i) contacting the aqueous source with an organic polymer composition to result in absorption of the oxoanion into the organic polymer composition to produce an oxoanion-containing organic polymer; and
(ii) removing the oxoanion-containing organic polymer from the aqueous source;
wherein the organic polymer composition comprises the following structure:

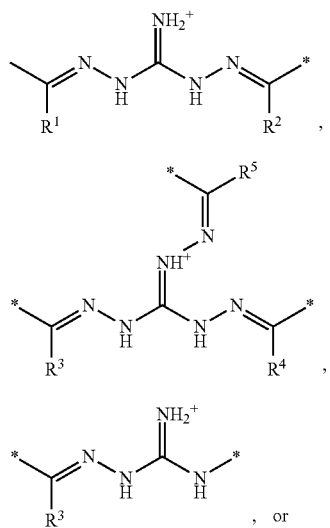

, or

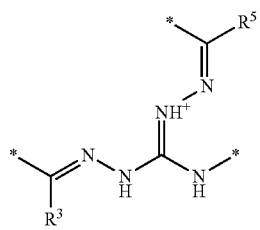

A units:

\*—R$\left(\text{—}*\right)_r$    B units:

wherein:
the composition includes at least two A units and at least one B unit;
each asterisk (\*) in the at least two A units denotes a connection point with an asterisk in the at least one B unit, provided that, in the event of surplus asterisks being present, one of the more surplus asterisks are terminated by endcapping groups;
R has the structure —$(CH_2)_t$—, wherein t is at least 1 and up to 30, and each hydrogen atom is optionally and independently substituted with a methyl or ethyl group;
the $R^1$, $R^2$, $R^3$, $R^4$, and $R^5$ groups are independently selected from hydrogen atoms and hydrocarbon groups containing 1-6 carbon atoms;
r is an integer of 1, 2, or 3; and
the composition necessarily includes an anionic species $X^{m-}$ with a magnitude of charge m of at least 1, wherein the sum of negative charge provided by anionic species $X^{m-}$ counterbalances the total positive charge provided by the at least two A units, provided that $X^{m-}$ is an anionic species exchangeable with the oxoanion in said aqueous source before said organic polymer composition contacts said oxoanion in step (i), and $X^{m-}$ is said oxoanion in the oxoanion-containing organic polymer.

\* \* \* \* \*